United States Patent [19]

Joas et al.

[11] Patent Number: 5,135,187
[45] Date of Patent: Aug. 4, 1992

[54] ARRANGEMENT FOR HOLDING AND LAYING A MULTIPLICITY OF JOINTLY GUIDED CABLES IN AN INSTALLATION SPACE OF A MOTOR VEHICLE

[75] Inventors: Rolf Joas; Berthold Guth, both of Stuttgart; Stefan Tokai, Sindelfingen, all of Fed. Rep. of Germany

[73] Assignee: Daimler-Benz AG, Fed. Rep. of Germany

[21] Appl. No.: 542,044

[22] Filed: Jun. 22, 1990

[30] Foreign Application Priority Data

Jun. 22, 1989 [DE] Fed. Rep. of Germany ....... 3920523

[51] Int. Cl.$^5$ .............................................. B60R 16/00
[52] U.S. Cl. ...................................... 248/49; 248/68.1
[58] Field of Search ................................. 248/49, 68.1

[56] References Cited

U.S. PATENT DOCUMENTS 4,877,973 10/1989 Torii et al. .......................... 248/49 X

FOREIGN PATENT DOCUMENTS 0091618 10/1983 European Pat. Off. .
0099115 1/1984 European Pat. Off. .
3402744 6/1985 Fed. Rep. of Germany .
3535392 9/1987 Fed. Rep. of Germany .
58-224832 12/1983 Japan .

Primary Examiner—Alvin C. Chin-Shue
Attorney, Agent, or Firm—Evenson, Wands, Edwards, Lenahan & McKeown

[57] ABSTRACT

The present invention relates to an arrangement for holding and laying a multiplicity of jointly guided cables in an installation space of a motor vehicle, the cables connecting units being laid along a predetermined line having at least one curvature, and so as to cover a mounting space at least partially and being fixed releasably alone this line, the cables being mounted at the end points of the line so as to be swivellably movable freeing the mounting space lying below them.

18 Claims, 1 Drawing Sheet

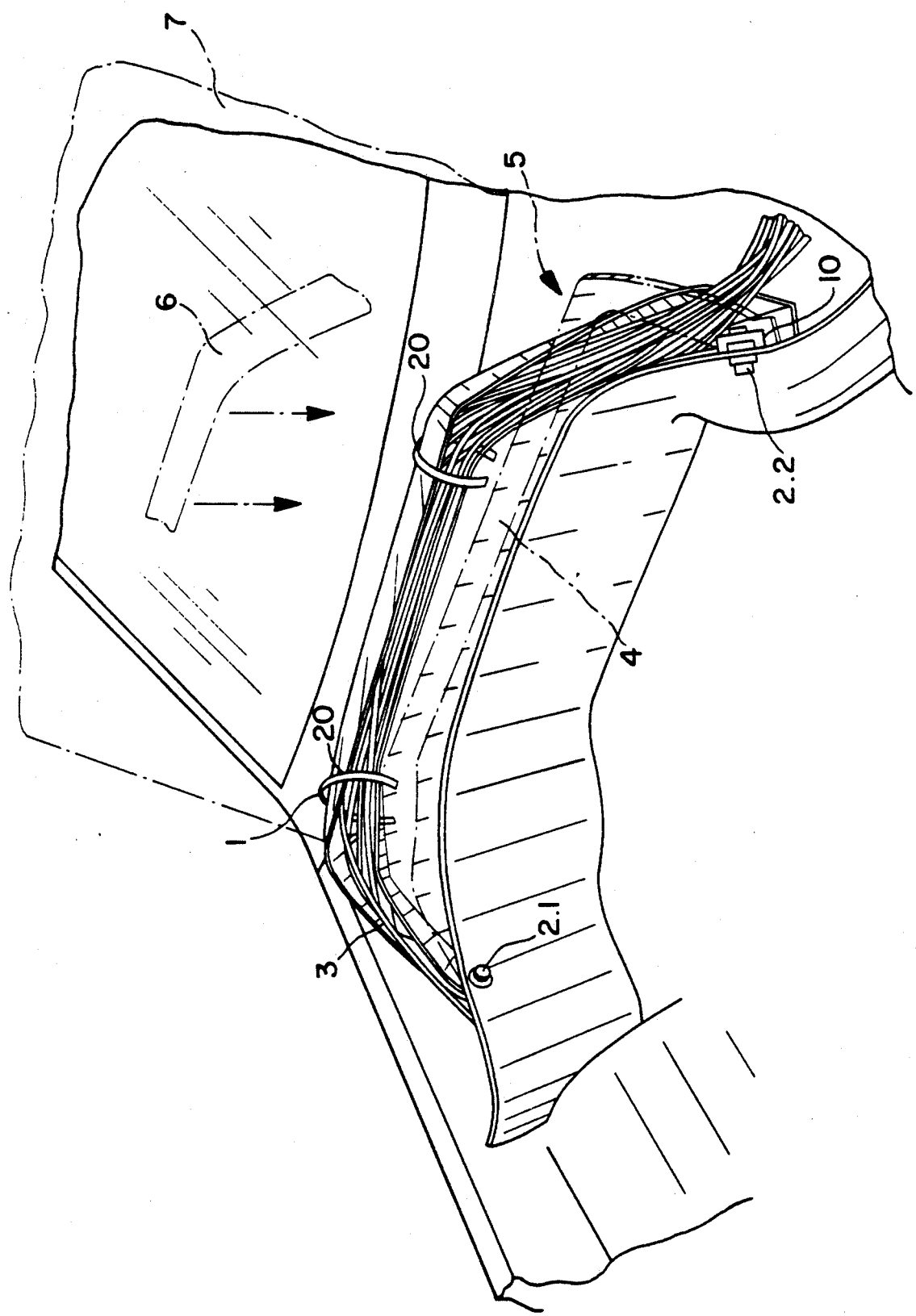

5,135,187

ARRANGEMENT FOR HOLDING AND LAYING A MULTIPLICITY OF JOINTLY GUIDED CABLES IN AN INSTALLATION SPACE OF A MOTOR VEHICLE

BACKGROUND AND SUMMARY OF THE INVENTION

The invention relates to an arrangement for holding and laying a multiplicity of jointly guided cables in an installation space of a motor vehicle, the cables being laid along a predetermined line having at least one curvature, and so as to cover a mounting space at least partially and being fixed releasably along this line.

An arrangement of the generic type is described in German Patent Document DE 34 02 744 Cl, according to which the cables are guided jointly in a cable duct above a mounting space. This cable duct is fixed firmly in its position and thus cannot be removed in order to reach the mounting space lying below it.

In addition, it is in principle known in motor vehicles that the cables can be united to form a cable harness. This cable harness is then attached at appropriate points using cable tapes. The necessity arises of removing the cable harness in order to be able to carry out mounting operations on a mounting space situated under this cable harness. For this purpose, the cable tapes of the cable harness must be released to enable the cable harness to be removed completely above the mounting space. If this cable harness comprises a plurality of cables, it has such a flexural strength that it can only be turned upon itself with difficulty, i.e. the cable harness must be pulled away with a great expenditure of force.

In this arrangement, disadvantages result such that the great expenditure of force necessary to remove the cable harness can lead to breaking of individual cables. In addition, the cable harness is laid along as direct a path as possible, as a result of which no space for access to a mounting space lying below the cable harness can be gained upon twisting the cable harness.

It is an object of the invention to design an arrangement for holding and laying a multiplicity of jointly guided cables in an installation space of a motor vehicle in such a way that easy access is possible to a mounting space lying below the cables, the cables being moved out of their normal position without the necessity to pull the cables with a great expenditure of force.

This object is achieved according to the invention in an arrangement of the generic type for holding and laying a multiplicity of jointly guided cables in an installation space of a motor vehicle, wherein the cables are mounted at the end points of the predetermined line so as to be swivellably movable, freeing the mounting space lying below them.

Further advantages of the invention compared to the known prior art are obtained if the cables are guided in a cable duct. In this case, it is not necessary first of all to release a plurality of cable tapes in order to remove the cable harness. The cables are then removed by the cable duct being released from its locking and pivoted away.

In the arrangement according to the invention, the cables are preferably guided on a curved line. The cables are mounted in a swivellably movable fashion at the two end points of the curved line. This swivellably movable mounting can, for example, be achieved by the cables having a predetermined bending point at the two end points of the curved line. In this case, the cables can be secured at the end points of the curved line in exactly the same way as in the course of the curved line.

The cables can be guided as a cable harness, i.e. the cables can be intertwined. As a result, a cable harness has a very great flexural strength. In the arrangement according to preferred embodiments of the invention, the intertwining of the cables is therefore in an advantageous manner resolved in the vicinity of two end points of the curved line in order in this way to reduce the flexural strength of the cable harness at these points. It is thus possible then to twist the cable harness about these two end points with a particularly low expenditure of force, the cable harness having a predetermined bending point at these two end points and otherwise essentially retaining its shape.

In a particularly advantageous manner according to certain preferred embodiments of the invention, the cables are guided in a cable duct. Even then, the cables are in certain circumstances twisted to form a cable harness, in which case this twisting should be resolved in the vicinity of the end points, as already described above. This cable duct preferably likewise has a predetermined bending point at the end points of the curved line. This predetermined bending point of the cable duct can be achieved by the course of the cable duct being interrupted at the end points of the curved line and being connected by means of hinges according to certain preferred embodiments of the invention. These hinges can here be designed in such a way that, when the cables are deflected out of their normal position, they build up a restoring force of the cables into their normal position. Alternatively, the cable duct can be manufactured from a material which permits bending about the end points of the curved line. In this case, a restoring force of the cables into their normal position arises due to the torsion of the material of the cable duct when the cables are deflected out of their normal position.

This cable duct can furthermore be closed by a cover, which is secured on the cable duct in a manner known per se. This closure of the cable duct can also be provided by a closure device, which closes off the engine compartment, resting on the cable duct in such a way that this closure device simultaneously closes off the cable duct.

The cables must be secured in their normal position along the curved line. If the cables are twisted to form a cable harness, this cable harness can be secured in a manner known per se, for example by cable tapes 20 (see figure). If a cable duct is used, this cable duct can be secured, for example, by self-locking spring clips or self-adhesive strips. If the closure device of the engine compartment simultaneously serves as closure of the cable duct, the cable duct can be pressed against an installation of the engine compartment by the closure device of the engine compartment in such a way that fixing of the cable duct in the normal position is ensured.

Other objects, advantages and novel features of the present invention will become apparent from the following detailed description of the invention when considered in conjunction with the accompanying drawings.

BRIEF DESCRIPTION OF THE DRAWINGS

The single drawing figure schematically depicts a portion of an automobile with jointly guided electrical cables installed according to a preferred embodiment of the invention.

DETAILED DESCRIPTION OF THE DRAWINGS

From the figure, it can be discerned that the cables 3 can be guided in a cable duct 1. This cable duct 1 is rotatably mounted at the two end points 2.1 and 2.2. A restoring force results from the torsion of the material of the cable duct 1 when the cable duct is deflected out of its normal position 4. Alternatively, the cable duct 1 can also be manufactured from a material which does not permit any torsion. In this case, hinges 10 must be fitted at the two end points 2.1 and 2.2 of the curved line which permit the rotary movement of the cable duct 1. Advantageously, these hinges bring about a restoring force, for example by means of a spring mechanism, when the cable duct 1 is deflected out of its normal position 4. The cable duct 1 can likewise be closed by means of a cover 6. This cover 6 is secured in a manner known per se on the cable duct, for example by clipping on. Alternatively, the cable duct 1 can also be closed by the closure device 7 of the installation space simultaneously serving in the closed condition as closure of the cable duct 1. In this case, the closure device 7 of the installation space can simultaneously be used in order to press the cable duct 1 against a firmly installed installation in the installation space and thus hold the cable duct 1 in its normal position 4. In the figure, the installation space is represented as an engine compartment.

An illustrative embodiment for holding jointly guided cables 3 is given below. The case described is that in which the cables 3 are guided in a cable duct 1, which is held in its normal position 4 by the closure device 7 of the engine compartment. After the opening of the closure device 7, the cable duct 1 can be swivelled. Prior to this, clamping devices which additionally fix the cable duct 1 in its normal position 4 are released, if required. After the cable duct 1 has been swivelled away, mounting operations in the mounting space 5 can be carried out. The cable duct 1 is subsequently guided back into its normal position 4 again and there fixed, if required, using the clamping devices. The closure device 7 of the engine compartment is then closed, the cable duct 1 thereby being additionally fixed in its position and closed in itself.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for holding and laying a multiplicity of jointly guided cables in a mounting space of a motor vehicle, comprising:
   a cable harness having great flexural strength formed from intertwining said jointly guided cables, said cable harness being shaped in a predetermined line having at least one curvature, wherein said predetermined line, in a first substantially horizontal position, at least partially covers said mounting space;
   said predetermined line including end points, one end point being located on each side at least one curvature and being formed at bending points wherein said multiplicity of jointly guided cables are not intertwined to substantially reduce the flexural strength of the cable harness at said end points and allow a pivoting of said cable harness with a low expenditure of force;
   means for supporting the cable harness at said end points;
   at least one releasable fixing means securing the cable harness in the first position whereby said cable harness is movable with only said low expenditure of force to a second position exposing the mounting space below the first position and allowing easy access thereto.

2. An arrangement according to claim 1, further comprising:
   a cable duct in which said cable harness is guided, said cable duct having predetermined bending points coinciding with said end points of the predetermined line; and
   means allowing pivotal movement of said cable duct about said predetermined bending points.

3. An arrangement according to claim 2, further comprising a cover for closing the cable duct.

4. An arrangement according to claim 2, further comprising a firmly mounted installation space; and
   wherein said at least one fixing means comprises a closing device mounted to the motor vehicle for pressing said cable duct in said first position against the firmly mounted installation space in which the jointly guided cables run to releasably fix the cable harness.

5. An arrangement according to claim 3, further comprising a firmly mounted installation space; and
   wherein said at least one fixing means comprises a closing device mounted to the motor vehicle for pressing said cable duct in said first position against the firmly mounted installation space in which the jointly guided cables run to releasably fix the cable harness.

6. An arrangement according to claim 1, wherein said at least one fixing means comprises cable tapes for fastening the cable harness.

7. An arrangement according to claim 1, wherein said at least one fixing means comprises a reactive force means for moving the cable harness into said first position as a result of reactive forces arising from a deflection of the cable harness out of its first position due to rotation about said end points.

8. An arrangement according to claim 7, wherein the reactive forces are at least partially produced form a torsion of a sheathing of said multiplicity of jointly guided cables.

9. An arrangement according to claim 7, wherein said reactive force means comprises a spring mechanism which during a pivotable movement of the cable harness generates at least partially the reactive forces for moving the cable harness into said first position.

10. An arrangement according to claim 8, wherein said reactive force means comprises a spring mechanism which during a pivotable movement of the cable harness generates at least partially the reactive forces for moving the cable harness into said first position.

11. An arrangement according to claim 2, wherein said at least one fixing means comprises a reactive force means for moving the cable harness into said first position as a result of reactive forces arising from a deflection of the cable harness out of its first position due to rotation about said end points.

12. An arrangement according to claim 4, wherein said at least one fixing means further comprises a reactive force means for moving the cable harness into said first position as a result of reactive forces arising form a deflection of the cable harness out of its first position due to rotation about said end points.

13. An arrangement for holding and laying a multiplicity of jointly guided cables in a mounting space of a motor vehicle, comprising:
a cable duct for guiding said multiplicity of jointly guided cables, said cable duct and said multiplicity of jointly guided cables being shaped in a predetermined line having at least one curvature, wherein said cable duct, in a first substantially horizontal position, at least partially covers said mounting space, and wherein said jointly guided cables include end points, one end point being located on each side of said at least one curvature and being formed at bending points of the jointly guided cables which are not substantially intertwined to provide a low flexural strength;
said cable duct having predetermined bending points coinciding with said end points of the jointly guided cables;
means for supporting the cable duct at said predetermined bending points; and
a releasable fixing means securing the cable duct in said first position whereby said cable duct is movable with a minimum expenditure of force to a second position exposing the mounting space below the first position and allowing easy access thereto.

14. An arrangement according to claim 13, further comprising a cover for closing the cable duct.

15. An arrangement according to claim 13, further comprising a firmly mounted installation space, wherein said releasable fixing means includes a closing device mounted to the motor vehicle for pressing said cable duct in said first position against the firmly mounted installation space.

16. An arrangement according to claim 13, wherein said releasable fixing means comprises a reactive force means for moving the cable duct into said first position as a result of reactive forces arising from a deflection of the cable duct out of its first position due to a rotation about its end points.

17. An arrangement according to claim 16, wherein the reactive forces are at least partially produced from a torsional rotation of said cable duct about its predetermined bending points.

18. An arrangement according to claim 16, wherein said reactive force means comprise a spring hinge mechanism for mounting said cable duct at its predetermined bending points to the motor vehicle for at least partially producing the reactive forces to move the cable duct into its first position.

* * * * *